US010445796B2

(12) United States Patent
Ahroon

(10) Patent No.: US 10,445,796 B2
(45) Date of Patent: Oct. 15, 2019

(54) SYSTEM AND METHOD FOR ACQUIRING, COMPARING AND EVALUATING PROPERTY CONDITION

(75) Inventor: Erik Mikael Ahroon, Newport Beach, CA (US)

(73) Assignee: MOUSIKI INC., Corona Del Mar, CA (US)

( * ) Notice: Subject to any disclaimer, the term of this patent is extended or adjusted under 35 U.S.C. 154(b) by 1367 days.

(21) Appl. No.: 12/541,390

(22) Filed: Aug. 14, 2009

(65) Prior Publication Data

US 2011/0040681 A1    Feb. 17, 2011

(51) Int. Cl.
*G06Q 30/06* (2012.01)

(52) U.S. Cl.
CPC .................... *G06Q 30/06* (2013.01)

(58) Field of Classification Search
CPC .. G06Q 50/163; G06Q 30/0645; G06Q 10/20; G06Q 30/02; G06T 15/10
USPC ............................................................ 705/1
See application file for complete search history.

(56) References Cited

U.S. PATENT DOCUMENTS

| 5,504,674 | A | * | 4/1996 | Chen et al. | 705/4 |
|---|---|---|---|---|---|
| 8,307,013 | B2 | * | 11/2012 | Ryu | H04N 5/232 707/803 |
| 9,842,373 | B2 | * | 12/2017 | Ahroon | G06Q 30/0645 |
| 2003/0093289 | A1 | * | 5/2003 | Thornley et al. | 705/1 |
| 2003/0190076 | A1 | * | 10/2003 | DeLean | 382/209 |
| 2004/0138896 | A1 | * | 7/2004 | Cheng | 705/1 |
| 2005/0071201 | A1 | * | 3/2005 | McNasby | 705/4 |
| 2005/0144018 | A9 | * | 6/2005 | Aptekar | 705/1 |
| 2006/0173707 | A1 | * | 8/2006 | Schubert et al. | 705/1 |
| 2006/0184440 | A1 | * | 8/2006 | Britti et al. | 705/35 |
| 2007/0027735 | A1 | * | 2/2007 | Rokos | 705/7 |
| 2007/0156429 | A1 | * | 7/2007 | Godar | 705/1 |
| 2009/0083093 | A1 | * | 3/2009 | Colletti | 705/7 |
| 2011/0040681 | A1 | * | 2/2011 | Ahroon | G06Q 20/10 705/39 |

FOREIGN PATENT DOCUMENTS

JP    5504674    *    5/2014    ............... G08G 1/01

OTHER PUBLICATIONS

Christmann, Samantha "Photos Help to Recoup Security Fee," May 18, 2009 Buffalo News.*

* cited by examiner

*Primary Examiner* — Daniel S Felten
(74) *Attorney, Agent, or Firm* — Erik Ahroon

(57) ABSTRACT

A system and method for acquiring, collecting, comparing and evaluating the condition of rental property at several time periods during a lease or rental agreement. A first image is compared to a second image, a deposit amount remaining is calculated based on the image comparison. The remaining deposit amount is paid using an electronic format.

17 Claims, 3 Drawing Sheets

SYSTEM AND METHOD FOR ACQUIRING, COMPARING AND EVALUATING PROPERTY CONDITION

FIELD OF INVENTION

The present invention relates to the field of property condition. More specifically, the invention relates to the technical field of acquiring, comparing and evaluating property conditions, particularly properties that are the subject matter of rental and/or lease agreements.

BACKGROUND OF THE INVENTION

Renting is a part of life; it's something that many people experience at some point in their lives. The concept of renting may involve real property or personal property. With personal property, the cost of renting is usually less than the actual value of the property being rented. The renter must have a certain degree of trust in order to rent to a rentee. This is overcome for the most part through a security deposit. For example, when renting a power tool at a rental center, the renter may ask the rentee to leave an open credit card slip or may ask for cash or may simply ask for a driver's license. With real property rentals, there is also usually a security deposit in place in case of a skipped payment or excessive cleaning fees. Many people have their first experience with security deposits when they move away to college and need to rent a dorm room or apartment. As is often the case, the security deposit is paid but either a portion or all of the security deposit is not returned.

Some common reasons that renters justify keeping this money is because of cleaning fees, missing items or simply items not being returned in the same condition that they were lent. For example if a renter claims that the rentee damaged the property, one way that a rentee can respond is to show evidence in the form of lists, marked diagrams, notes, pictures etc. Often times, the rentee is not legally savvy enough or simply not conscientious enough to collect this evidence at the appropriate times. The end result being that the rentee loses part or all of the deposit.

Thus, there exists a need for a standardized system and method of collecting this evidence at the appropriate times and securely storing the evidence. Furthermore, there exists a need to be able to substantively compare the condition of items before a rental to the condition of items after a rental. As presently disclosed, this system will preferably be able to create a differential image or a differential list, which cites or makes evident the differences in the two conditions. Even more, this system could also possess the ability to identify the items and evaluate the differences in conditions and the differences in price. This could also correlate to a percentage of any deposit amounts that had been paid.

SUMMARY OF THE INVENTION

The present invention relates to property condition and methods for determining property condition. In some embodiments, determining property condition may be implemented on a general purpose computer or embedded system. In other embodiments, a user utilizes a camera or video recorder, a general purpose computer with internet connection and a website that contains secure personalized pages for different users. Additionally, a server computer (which may host the website) with both RAM memory and ROM memory that executes software for processing information for determining the property condition, and a database.

One aspect of the invention provides a method for determining property condition comprising receiving a first image, receiving a second image, comparing the first image to the second image, determining the remaining deposit amount.

DETAILED DESCRIPTION OF THE PREFERRED EMBODIMENT

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
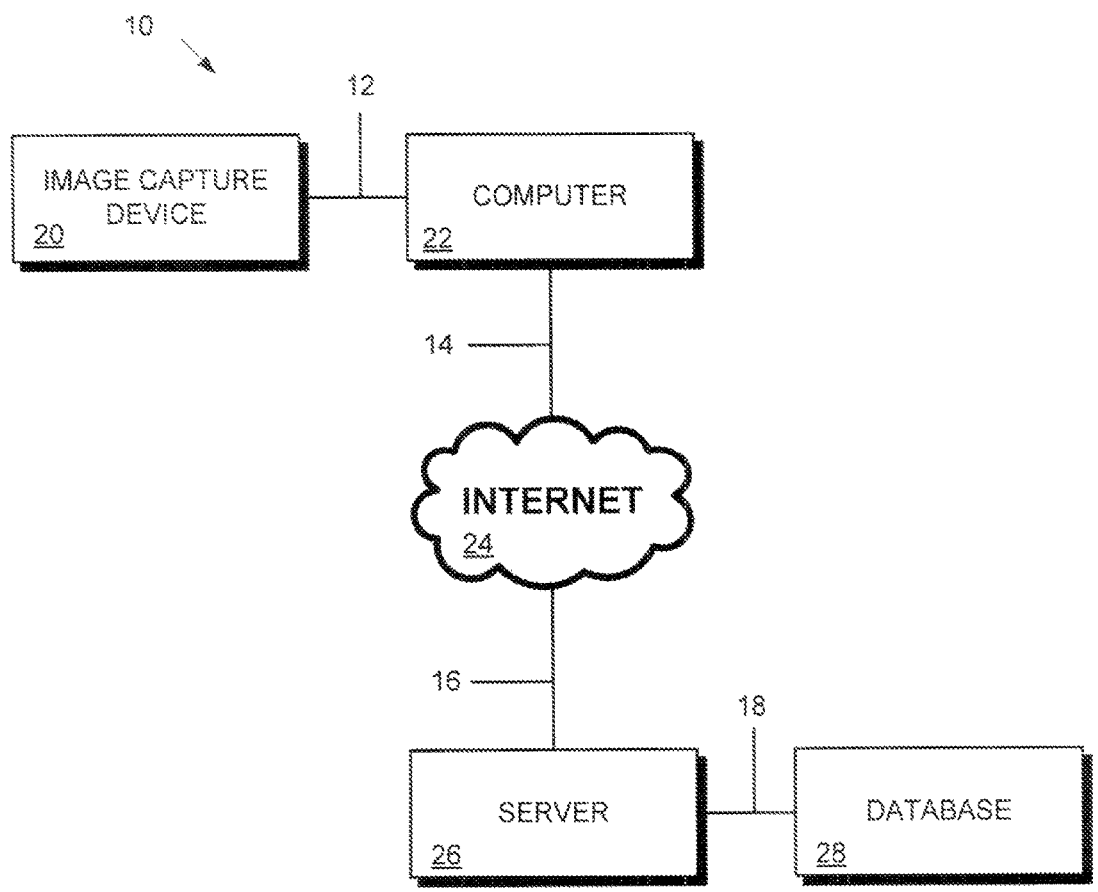
FIG. 1 is a block diagram showing one aspect of the present invention depicting a limited number of components in an exemplary system for implementing the present invention.

Referring to FIG. 1, system 10 depicts a system that is used in determining property condition or the remaining deposit. 20 is an image capture device such as a digital camera, camera phone, VCR, digital video camera, analog video camera with an analog-to-digital converter, analog camera with an analog-to-digital converter, scanner, 3D scanner, or any device that captures an image thru an optical lens and provides a digital representation of the image a GPS receiver is also optionally included in image capture device 20. 20 is a general purpose computer that includes but is not limited to a processor or CPU, hard disk, memory, system bus, keyboard, display device, and optional I/O ports such as Bluetooth, Wireless such as IEEE 802.11, VGA, SVGA, HDI, USB, Ethernet, Serial, Parallel and optional proprietary ports (all not shown). The CPU or processor is operatively connected to memory. The memory usually contains a program that is adapted to be executed by the CPU or processor. 20 may include a connection to the Internet such as a modem or local area network connection through which the internet may be reached. 24 depicts the Internet. The Internet 24 includes any and all switches, routers, hubs, modems, cable modems, wireless access points, computers, servers, and all wired or wireless connections and any other devices, physical connections (wires) or wireless connections that enable a connection to and throughout the Internet. 26 is a general purpose computer such as in 20. 26 may optionally also be configured to operate 24 hours a day, 365 days a year. Optionally, in such cases, multiple hard drives may be implemented in a RAID configuration and other configurations for heat dissipation and power may be used as is known in the art of server computers. 26 may be configured and/or optimized to execute a web server such as a Microsoft IIS Server, or Apache Server. 28 is a general purpose computer such as in 26. 28 may be configured and/or optimized to also execute a database program such as MySQL, Oracle, SQL, or any other database software program on the market. 28 is an optional computer because 26 may be configured to also execute a database software program. 12, 14, 16, and 18 are communications links. Data messages from or to any of the elements 20, 22, 26, and 28 may travel on a wire or wirelessly. Communications links 12, 14, 16 and 18 in some embodiments are wired communications links. In some embodiments, communications links 12, 14, 16, and 18 may be standard wireless cellular phone connections as is known to those skilled in the art. In other embodiments, communications links 12, 14, 16 and 18 may be EV-DO, GPRS or other data links across a cellular communications network. In another alternative embodiment, communications links 12, 14, 16, and 18 may be standard Ethernet communications links. In each of the communication links 12, 14, 16, and 18 embodiments, described herein there may be switches, routers, hubs and servers, not shown in FIG. 1. Depending on the type of communications links 12, 14, 16, and 18 selected, the elements 12, 22, 26, and 28 will have the necessary hardware and software to communicate across the selected type of communications links 12, 14, 16, and 18. Communications links 12, 14, 16, and 18 may all or partly be secure links. Communications links 12, 14, 16, and 18 may be any combination of link type described above.

Figure 2:
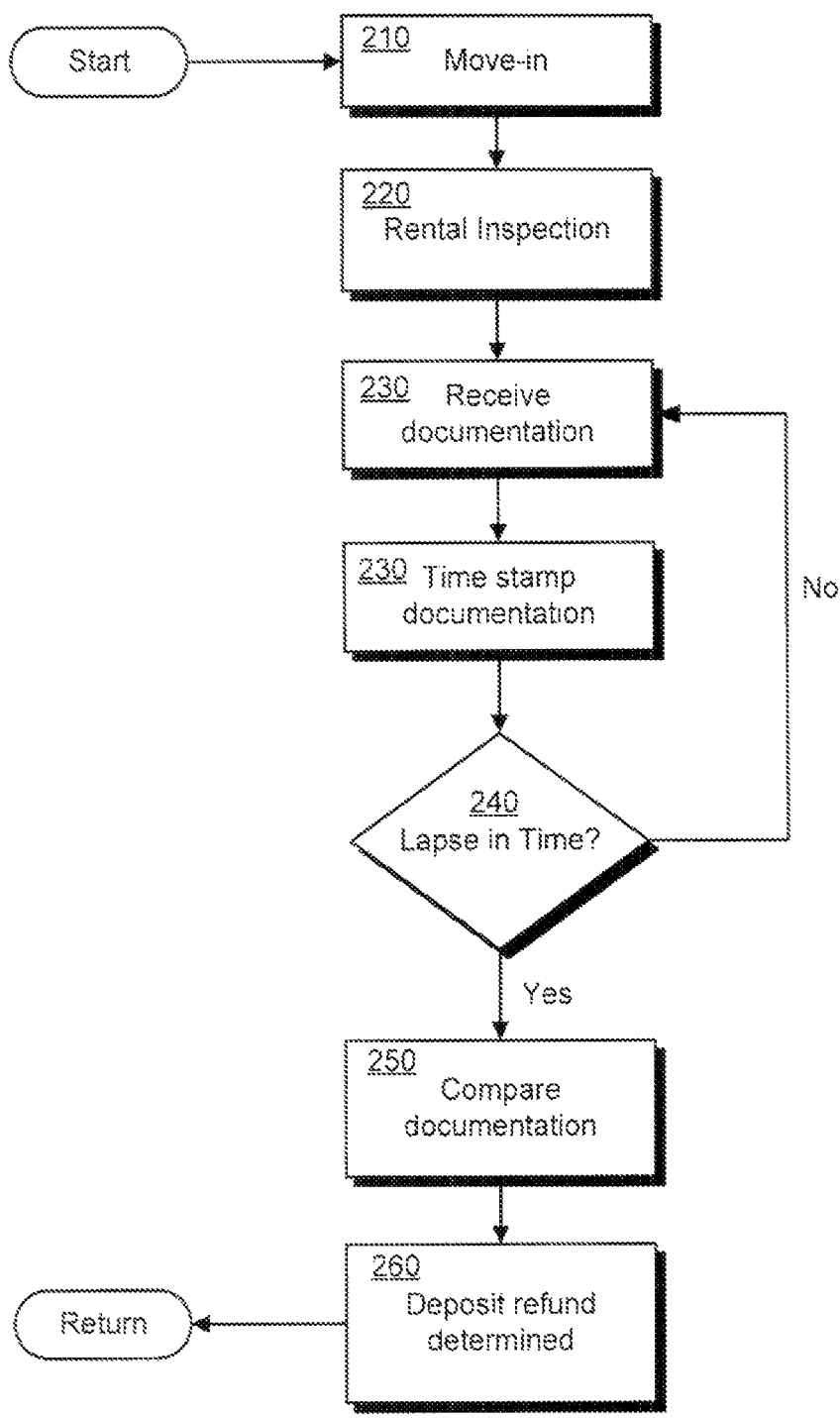
FIG. 2 is a logic flow diagram of a method showing one aspect of the present invention, for determining the remaining deposit using document information.

FIG. 2. depicts a process for determining the remaining deposit using document information. The process may be performed, for example, by the system of FIG. 1. For example, the process elements in FIG. 2 may be executed individually or in combination with an image capture device 20, general purpose computer 20, server computer 26, or database computer 28. In otherwords, any of the process elements in FIG. 2. may be executed on any of the elements in FIG. 1. individually or in combination. In block 210, a move-in occurs at a rental property. For example a rentee rents an apartment and moves in or executes a lease or rental agreement on a certain date. In alternate embodiments, this could also indicate a move-in date for a mortgaged property (ie. house, store, etc.), a rental date for personal property, such as the date a rentee rents a power tool, or the commencement of a lease. In some embodiments a move-in may also indicate that an account is created for the user and initial information about the user is entered and stored into a memory by the process. For example, information such as the original security deposit amount, the user name and address information and any other information that may be helpful in identifying the user. Block 210 is an optional block and may not be included in all embodiments where the presently described system and method are used. In block 220, a rental inspection is performed by the user or rentee. For example the user/rentee may fill out a check list indicating the condition of each of the items rented. For example, in the real property rental example, the user/rentee may indicate stove [not working], refrigerator [OK], carpet stains master bedroom [yes]. These responses may be checked off on a sheet of paper or they may be entered via a web page delivered by server 26 to general computer 22. 220 may include determining which conditions will need to be documented. A rental inspection may be performed twice once upon the start of a rental agreement and once upon terminating or ending a rental agreement. We can refer to the information gathered upon move-in as a first document and we can refer to the information gathered upon termination of a rental agreement as a second document. Later in block 250 the first document and the second document will be compared. Block 230, the documentation from block 220 is received into a memory. In some embodiments this is performed by taking digital pictures and uploading them into a memory through a website. In alternate embodiments, electronically formatted documents such as word documents, adobe PDF documents, CSV documents, text documents, or responses to an electronic questionnaire delivered by a website hosted on server 26 may be received by a memory residing on server 26 or database 28. Block 240, the documentation received from block 220 is time stamp with the date and time that the documentation is received into memory. In block 240, a query is posed as to whether there has been a significant lapse of time from the last time the process received documents from this particular user/rentee. If there has not been a significant lapse of time then the process may jump back to block 230 where the process may receive more documentation such as a second documentation. Usually a significant lapse of time for a rental property will be at least three month, but any period of time may be used based on the specific circumstances. Block 240 is an optional block because the process could be set up to automatically compare documents or the document comparison may be invoked manually. If there has been a significant lapse of time, then block 250 is reached which may mark the end of a rental period. Any documentation that was previously received can be compared by the process and the results returned to the user. For example, the first document and the second document may be compared. Additionally, the results of the comparison could be sent to a landlord, rentee, title company, attorney or interested third party or any combination of the above via an email, electronic alert or snail mail. In some embodiments, document comparison comprises comparing responses to a check list. For example, if the process receives a rental property checklist the day a tenant/rentee/user moves into a property and then receives the same rental property checklist from the property manager upon the end of the rental period then the process will compare the responses for each item. Specifically, if the tenant/rentee/user indicates in the rental property check list, on the move in date, that the refrigerator is OK on the check list then the process will compare the status of the refrigerator for the document that was received by the process at the end of the rental period from the rental property manager. If the property manager indicates the refrigerator as broken then the compare process will flag this difference and store this difference in a memory. In alternative embodiments many documents may be stored in server 26 or database 28 and used as a baseline in comparing documents. Block 260, the appropriate deposit can be calculated and returned to the user. In some embodiments, each item in a rental property checklist may be stored in a database such as the database in 28. Additionally, standard amounts for damage to each item may also be stored in database 28. For example, one item may be a refrigerator. If a difference is flagged for the refrigerator, in block 250 then a standard sum of money such as $100.00 may be automatically deducted from the security deposit. For example the deposit refund is determined by subtracting $100.00 from the original security deposit that was paid by the tenant/rentee/user. In this example block 260 may also automatically pay the remaining deposit refund via an electronic payment service such as PayPal or check may be made out to the tenant/rentee/user for the remaining deposit amount and sent via snail mail.

Figure 3:
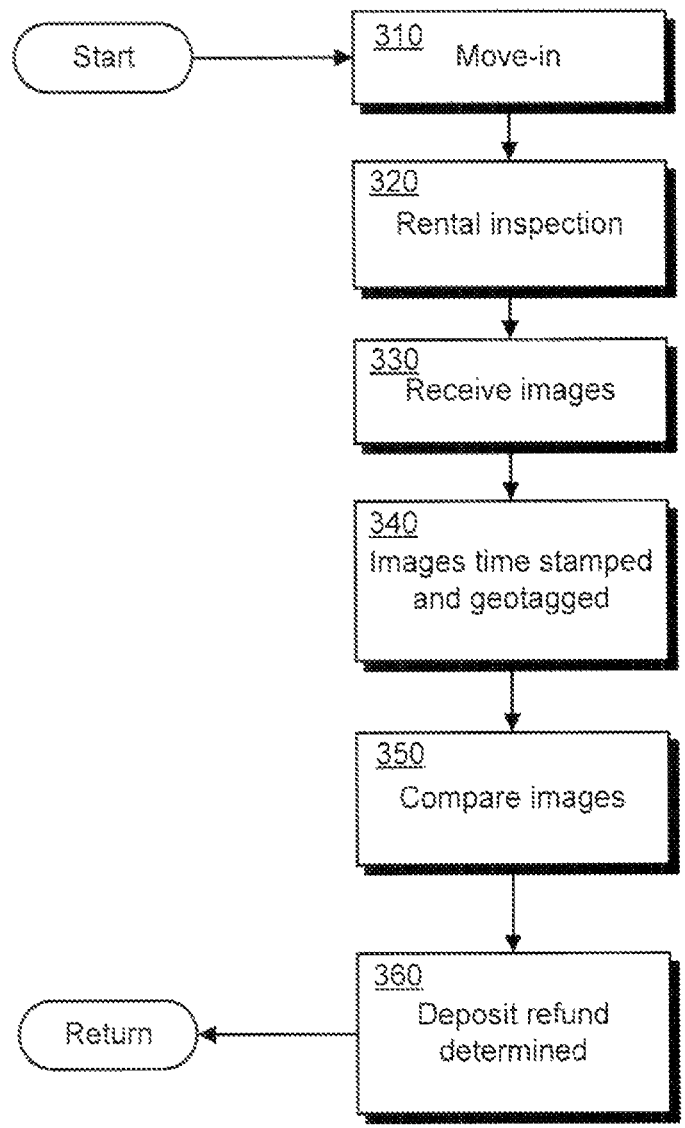
FIG. 3 is a logic flow diagram of a method showing one aspect of the present invention for determining the remaining deposit using image comparison.

FIG. 3. depicts a process for determining the remaining deposit using image information. The process may be performed, for example, by the system of FIG. 1. For example, the process elements in FIG. 3 may be executed individually or in combination with an image capture device 20, general purpose computer 20, server computer 26, or database computer 28. In otherwords, any of the process elements in FIG. 3. may be executed on any of the elements in FIG. 1. individually or in combination. Block 310, is similar to block 210 and will not be discussed again. In block 320 a rental inspection is performed. In some embodiments, a user/rentee may perform a rental inspection by using an image capture device 20 to capture images of a premise in the embodiment of a real estate property rental. A rental inspection may be performed twice once upon move-in called a first image or first set of images and then later upon termination or end of a rental agreement called a second image or second set of images. In block 330, the images captured from block 320 are received into a memory. In some embodiments this is performed by taking digital pictures and uploading them into a memory through a website. In some embodiment's geotagging, time and date information may be included with the image stored into a memory. In block 340 the images are geotagged, time and date stamped if this information is not included with the captured and stored images. In some embodiments the geotagging process comprises using software such as the OziPhotoTool which can be found at the website of oziphototool. In other embodiments tile geotagging process may be embedded into an image capture device 20. The time and date stamping process usually occurs within an image capture device 20 but may also be performed by software executable separate from the image capture device 20. In block 350, the images are compared. In some embodiments, this is performed digitally using a pixel scanner. It can also be performed using an optical sensor or any other techniques known in the art. In other embodiments, the image comparison may be performed by software known as Compare Suite by AKS-LABS, which could be found at website of compare suite. Once the images are compared, they are sorted so that a person may compare the sorted images. Each of the sorted images is compared to each other to determine its before and after images. For example, in a real property rental the user will capture images upon move-in a first image or set of images then these images will be compared to images of the same items upon termination of the lease a second image or set of images. If the differences between the images are significant then these differences are flagged this may be a manual process. In alternative embodiments, the previous captured images may be stored in server 26 or database 28 and used to form a baseline to be used in the comparison. In Block 360, the appropriate deposit can be calculated and returned to the user. In some embodiments, each item in a rental property image list may be stored in a database such as the database in 28. Additionally, standard amounts for damage to each item may also be stored in database 28. For example, one item may be a refrigerator. If a difference is flagged for the refrigerator, in block 350 then a standard sum of money such as $100.00 may be automatically deducted from the security deposit. For example the deposit refund is determined by subtracting $100.00 from the original security deposit that was paid by the tenant/rentee/user. In this example block 360 may also automatically pay the remaining deposit refund via an electronic payment service such as PayPal or check may be made out to the tenant/rentee/user for the remaining deposit amount and sent via snail mail.

EXAMPLE 1

A college student rents an off campus apartment for the semester. Before moving in all her belongings, she uses her smartphone to take pictures of the inside of the apartment, including the walls, flooring, cabinetry, appliances, and any furnishings. She then logs on to a secure website and uploads her images to her account. The system time stamps and date stamps the images and incorporates the location coordinates based on the address provided by the student. At any point, the student can view her profile and input the amount of her security deposit that was paid to her landlord. At the end of the semester, she again takes pictures of the same places and objects to record any changes in condition. The system can suggest an amount of security deposit that could be retained by her landlord. She may also choose to allow access to the images to her landlord, family or a legal advisor.

EXAMPLE 2

A family purchases their first house that has just been built. They call a professional who works for the business using the disclosed system to come out periodically and record the progress of the construction. The professional brings a camera that can geotag and date stamp the images at the moment they are taken. Later, the images are uploaded to the families account. Five years later, the family has flooring that buckles up from the ground. The builder alleges that the family caused the damage by excessively watering their yard. The family can then use images from the construction to show that an adequate water barrier was never laid under the foundation.

EXAMPLE 3

A businessman flies out of town to give a three day presentation. At the airport, he rents a car, deciding not to purchase the additional insurance, and uses his digital camera to take pictures of the car's condition. The car has a minor scratch in the passenger door and a minor ding in the rear bumper. He signs in to his account at the rental agency and they upload the pictures. During the trip, he notices a car backing out next to him possibly grazes the passenger side. He can not tell if this caused any extra scratching. After he returns the car, he again takes pictures of the car's condition, logs in to his account and can show the rental agency that the identical scratching was already present when the car left the lot.

EXAMPLE 4

Honeymooners are vacationing in Hawaii when they decide to windsurf for a few hours. They find a rental hut and pay a $50 deposit to return the sail boards. The rental hut quickly videos the boards, logs in to an account set up for al their customers and uploads the videos. They then accept the deposit amount and have the couple sign a liability agreement before taking the boards out. While in the water, the wife falls and the husband paddles over to assist her. In the process, the mast from her sail pierces his sail and causes a small tear. The boards are returned and again the rental hut videos and uploads the images. The system calculates the amount of damage based on the clips and a set price for the boards and sails. It determines that the couple owes an additional $100 beyond their deposit for the accident.

EXAMPLE 5

A woman is driving on her way to work in heavy rain. The car behind her is unable to see and crashes into her. She is not hurt and happens to have a camcorder on her PDA. She videos the condition of both cars and the occupants of the car that hit her, along with their conversation. After quickly texting her insurance company of the accident, they can login to her account and view a real time streaming video that is being transmitted in order to better assess the situation. The woman then gets a copy of the other driver's insurance and continues on her way to work.

The present invention includes any novel feature or combination of features disclosed herein either explicitly or any generalization thereof. While the invention has been described with respect to specific examples including presently preferred modes of carrying out the invention, those skilled in the art will appreciate that there are numerous variations and permutations of the above described apparatus and techniques. Thus, the spirit and scope of the invention should be construed broadly as set forth in the appended claims.

What is claimed is:

1. A server-implemented method of determining a deposit refund for a renter associated with a rental property, the method comprising:
   receiving and storing, by the server, a first set of images of the rental property captured using one or more image capturing devices, upon commencement of a rental period, wherein the one or more image capturing devices embed the first set of images with time stamp, date stamp, and geotag information;
   receiving and storing, by the server, a second set of images of the rental property captured using the one or more image capturing devices, upon termination of the rental period, wherein the one or more image capturing devices embed the second set of images with time stamp, date stamp, and geotag information;
   comparing, by the server, an image belonging to the first set of images and another image belonging to the second set of images, for identifying damages to items of the rental property, based on the time stamp, the date stamp, and the geotag information, wherein the image and the other image relate to same views of the rental property;
   assigning, by the server, monetary values associated with each of the damages to the items of the rental property; and
   calculating, by the server, a refund amount of the deposit based on an initial deposit amount and each of the monetary values, wherein the rental property is a real property.

2. The method of claim 1 further comprising the step of transmitting the refund amount of the deposit to a user in an electronic format.

3. The method of claim 2 further comprising transmitting information about the refund amount of the deposit to a third party in an electronic format.

4. The method of claim 1 wherein the one or more image capturing devices are at least one of a digital camera, camcorder, camera phone, or video recorder.

5. The method of claim 1 wherein at least one image from the first set of images and the second set of images comprises a list of items.

6. The method of claim 1 wherein at least one image from the first set of images and the second set of images comprises a photograph of said rental property.

7. The method of claim 1 wherein at least one image from the first set of images and the second set of images comprises a video of said rental property.

8. The method of claim 1 wherein the assigning step further comprises determining the monetary values based on whether the items of the rental property, having damages, are to be repaired or replaced.

9. A server for determining a deposit refund for a renter associated with a rental property, the server comprising:
   a memory storing a program;
   a processor in communication with the memory wherein the processor is directed by the program to:
   receive and store a first set of images of the rental property captured using one or more image capturing devices, upon commencement of a rental period, wherein the one or more image capturing devices embed the first set of images with time stamp, date stamp, and geotag information;
   receive and store a second set of images of the rental property captured using the one or more image capturing devices, upon termination of the rental period, wherein the one or more image capturing devices embed the second set of images with time stamp, date stamp, and geotag information;
   compare an image belonging to the first set of images and another image belonging to the second set of images to identify damages to items of the rental property, based on the time stamp, the date stamp, and the geotag information, wherein the image and the other image relate to same views of the rental property;
   assign monetary values associated with each of the damages to the items of the rental property; and
   calculate a refund amount of the deposit based on an initial deposit amount and each of the monetary values, wherein the rental property is a real property.

10. The system of claim 9 further comprises transmitting a payment equal to the refund amount of the deposit to a user in an electronic format.

11. A non-transient computer-readable medium storing computer-readable instructions that direct a microprocessor to:
   receive and store a first set of images of the rental property captured using one or more image capturing devices, upon commencement of a rental period, wherein the one or more image capturing devices embed the first set of images with time stamp, date stamp, and geotag information;
   receive and store a second set of images of the rental property captured using the one or more image capturing devices, upon termination of the rental period, wherein the one or more image capturing devices embed the second set of images with time stamp, date stamp, and geotag information;
   comparing, by the server, an image belonging to the first set of images and another image belonging to the second set of images, for identifying damages to items of the rental property, based on the time stamp, the date stamp, and the geotag information, wherein the image and the other image relate to same views of the rental property;
   assign monetary values associated with each of the damages to the items of the rental property;
   calculate refund amount of a deposit based on an initial deposit and each of the monetary values; and
   send payment of the refund amount of the deposit via an electronic format.

12. A server-implemented method of determining property condition using a CPU (Central Processing Unit) and a memory operatively connected to the CPU and containing a program adapted to be executed by the CPU for comparing two documents and calculating a remaining deposit amount, the method comprising:

receiving and storing a first document in the memory, the first document comprising information showing a condition of rental property recorded upon commencement of a rental period;

receiving and storing a second document in the memory, the second document comprising information showing a condition of the rental property recorded upon termination of the rental period, wherein the first document and the second document are embedded with timestamp, date stamp, and geotag information;

executing the program in the CPU for:

comparing the first document to the second document for identifying damages to items of the rental property, based on the time stamp, the date stamp, and the geotag information, wherein the information present in both the first document and the second document relate to same views of the rental property;

assigning monetary values associated with each of the damages to the items of the rental property; and calculating a refund amount of a deposit based on an initial deposit amount and each of the monetary values.

13. The method of claim 12 further comprising the step of transmitting to a user the refund amount of the deposit in an electronic format.

14. The method of claim 12, wherein the first document includes a first video of the rental property and the second document includes a second video of the rental property.

15. The method of claim 14, further comprising comparing the first video to the second video to determine damages to the items of the rental property.

16. The method of claim 12, wherein the first document includes a first checklist including questions about the condition of the rental property and answers received from the rentee, and the second document includes a second checklist about the condition of the rental property.

17. The method of claim 16, further comprising comparing the first checklist to the second checklist to determine damages to the items of the rental property.

* * * * *